US006341960B1

(12) United States Patent
Frasson et al.

(10) Patent No.: US 6,341,960 B1
(45) Date of Patent: Jan. 29, 2002

(54) METHOD AND APPARATUS FOR DISTANCE LEARNING BASED ON NETWORKED COGNITIVE AGENTS

(75) Inventors: Claude Frasson, Ville Mont-Royal (CA); Guy Gouardères, Toulouse (FR)

(73) Assignee: Universite de Montreal, Montreal (CA)

( * ) Notice: Subject to any disclaimer, the term of this patent is extended or adjusted under 35 U.S.C. 154(b) by 0 days.

(21) Appl. No.: 09/325,429

(22) Filed: Jun. 4, 1999

(30) Foreign Application Priority Data

Jun. 4, 1998 (CA) .............................................. 2239666

(51) Int. Cl.[7] .............................................. G09B 7/00
(52) U.S. Cl. ...................... 434/322; 434/323; 434/118
(58) Field of Search ............................... 434/322, 323, 434/362, 118, 350

(56) References Cited

U.S. PATENT DOCUMENTS

| | | | | |
|---|---|---|---|---|
| 5,535,422 A | * | 7/1996 | Chiang et al. | 395/155 |
| 5,540,589 A | * | 7/1996 | Waters | 434/156 |
| 5,597,312 A | * | 1/1997 | Bloom et al. | 434/362 |
| 5,727,950 A | * | 3/1998 | Cook et al. | 434/350 |
| 6,024,577 A | * | 2/2000 | Wadahama et al. | 434/322 |

OTHER PUBLICATIONS

Auerbach, Barbara. "Jenny & her trig problem". School Library Journal. New York. Jan. 1998.*
Houston–Wilson, Cathy et al. "Peer tutoring: A plan for instructing students of all abilities". Journal of Physical Education, Recreation & Dance. Reston, Aug. 1997.*
C&EN Washington, Rebecca Rawls (Education) Experiments In Online Chemistry, May 24, 1999, pp34–37.
Lecture Notes in Computer Science # 1452, Intelligent Tutoring Systems, 4th international Conference, ITS '98, San Antonio, Texas—Aug. 1998 proceedings "LANCA: a distance Learning Architecture based on Networked Cognitive Agents", by Claude Frasson, Louis Martin, Guy Gouardéres and Esmal Aimeur (document contains 10 pages).
Ragnemalm, E. L., "Collaborative Dialogue with a Learning Companion as a Source of Information on Student Reasoning". Proceedings of the workshop on Intelligent Tutoring Systems. *ITS 96*. Montreal. Jun. 1996.
Slator, B. M., Chaput, H., "Learning by Learning Roles: A Virtual Role–Playing Environment for Tutoring". Proceedings of the workshop on Intelligent Tutoring Systems, *ITS 96*, Montreal, Jun. 1996.

(List continued on next page.)

Primary Examiner—Valencia Martin-Wallace
Assistant Examiner—Julie Kasick
(74) Attorney, Agent, or Firm—Michael D. Bednarek; Shaw Pittman LLP (57) ABSTRACT

The Intelligent Tutoring System (ITS) uses the Internet as a constructivist learning environment and aims to provide intelligent assistance to improve both quality of training and distribution of knowledge in a distance learning situation. The assistance is based on various intelligent Agents which act collaboratively to support learning at different steps. A first Agent (pedagogical Agent), close to the learner, is able to detect his difficulties using a learner model and provides local explanations when needed or on request. A second Agent (dialog Agent) provides access to other explanations or learners available on the Web, in synchronous or asynchronous mode. Taking into consideration all possible helps a third Agent (negotiating Agent) is in charge of finding and selling explanations according to a market of requests and helps. A fourth Agent (moderator) in charge of determining which explanation was finally useful to serve as a permanent source of explanation for future learners

13 Claims, 4 Drawing Sheets

OTHER PUBLICATIONS

Srisethanil, C., Baker, N. C., "ITS–Engineering: A Domain Independent ITS for Building Engineering Tutors". Proceedings of the workshop on Intelligent Tutoring Systems, *ITS 96*, Montreal, Jun. 1996.

Pirolli, P., Wilson, M., "Measuring Learning Strategies and Understanding: A Research Framework". Proceedings of the workshop on Intelligent Tutoring Systems, *ITS 92*, Montreal, Jun. 1992.

Major, N., Reichgelt, H., "COCA: A Shell for Intelligent Tutoring Systems". Proceedings of the workshop on Intelligent Tutoring Systems, *ITS 92*, Montreal, Jun. 1992.

Beck, J. E., Woolf, B. P., "Using a Learning Agent with a Student Model". Proceedings of the workshop on Intelligent Tutoring Systems, *ITS 98*, San Antonio, Texas, Aug. 1998.

Soller, A., Goodman, B., Linton, F., Gaimari, R., "Promoting Effective Peer Interaction in an Intelligent Collaborative Learning System". Proceedings of the workshop on Intelligent Tutoring Systems, *ITS 98*, San Antonio, Texas, Aug. 1998.

Tecuci, G., Keeling, H., "Developing Intelligent Educational Agents with the Disciple Learning Agent Shell". Proceedings of the workshop on Intelligent Tutoring Systems, *ITS 98*, San Antonio, Texas, Aug. 1998.

Yin, J., El–Nasr, M. S, Yang, L., Yen, J., "Incorporating Personality into a Multi–Agent Intelligent System for Training Teachers". Proceedings of the workshop on Intelligent Tutoring Systems, *ITS 98*, San Antonio, Texas, Aug. 1998.

Abou–Jaoude, S. C., Frasson, C., "Integrating a Believable Layer into Traditional ITS". Proceedings of the workshop on pedagogical agents, Le Mans, France, 1999.

Abou–Jaoude, S. C., Frasson, C., "Emotion Computing in Competitive Learning Environments". Proceedings of the workshop on pedagogical agents, Fourth International Conference *ITS 98*, Texas, 1998.

Hayes–Roth, B., "An Architecture for Adaptive Intelligent Systems". *Artificial Intelligence: special issue on agents and interactivity*, pp. 327–365, 1995.

Sycara, K., Pannu, "A Learning Personal Agent for Text Filtering and Notification". Proceedings of the International Conference of Knowledge Based Systems (KBCS 96), 1996.

Sycara, K., Decker, K. Pannu, A., Williamson, M., and D.Zeng. "Distributed Intelligent Agents" i IEEE Expert, 1996.

Sycara, K., Decker, K., Pannu, A., Williamson, M.. "Designing Behaviors for Information Agents". Proceedings of the First International Conference on Autonomous Agents (AGENTS–97), 1997.

Frasson, C., Aïmeur, E., "Lessons Learned From a University–Industry Cooperative Project in Tutoring Systems". *Failure & Lessons Learned in Information Technology Management*, vol. 1, pp 149–157, 1997.

Frasson, C., Aïmeur, E., "Designing a Multi–Strategic Intelligent Tutoring System for Training in Industry". *Computers in Industry 37*, pp. 153–167, 1998.

Frasson, C., Aïmeur, E., "A Comparison of Three Learning Strategies in Intelligent Tutoring Systems". *Journal of Educational Computing Research*, vol. 14 (4), pp. 371–383, 1996.

Frasson, C., Aïmeur, E., Dufort, H., Leibu, D., "Some Justification for the Learning by Disturbing Strategy". *Artificial Intelligence in Education*, IOS Press, pp. 119–126, 1997.

Houston–Wilson, C., Lieberman, L., Horton, M., Kasser, S., "Peer Tutoring: A plan for instructing students of all abilities". *Journal of Physical Education, Recreation & Danse*; Reston; Aug. 1997.

Espinosa, E., Brito, A., Ramos, F., "Intelligent Agent–Based Virtual Education using Java Technology". Proceedings of the workshop on Intelligent Tutoring Systems, *ITS 96*, Montreal, Jun. 1996.

Katz, S. Lesgold, A., Eggan, G., Greenberg, L., "Towards the Design of More Effective Advisors for Learning–by–Doing Systems". Proceedings of the workshop on Intelligent Tutoring Systems, *ITS 96*, Montreal, Jun. 1996.

* cited by examiner

FIG-1

MCQ : Multiple Choice Question, MCSQ : Multiple Choice Serial Question
MMCQ : Multiple Multiple Choice Question

FIG_2

METHOD AND APPARATUS FOR DISTANCE LEARNING BASED ON NETWORKED COGNITIVE AGENTS

FIELD OF THE INVENTION

The Present invention relates to Intelligent Tutoring Systems (ITS) on the Web and, more particularly, to a system and a method for assisting the learner involved in distance learning situation on the Internet by several types of intelligent Agents. It also relates to knowledge mining by discovering on the Internet which help appears useful in a given context.

BACKGROUND OF THE INVENTION

Correspondence courses, the earliest form of distance learning, have been in widespread use since the end of the $19^{th}$ Century. As communications tools have been developed, so have distance learning methods, namely the use of television broadcasts, video recordings, computers and multi-media have been applied for distance learning purposes.

The Internet is the first widespread public access data network, and it too has been applied to distance learning. A product in the market today is the Virtual Learning Network (VLN), which provides HTML based learning materials and includes discussion forums and chatrooms. The VLN is supported by the US Government's Telecommunications and Information Infrastructure Assistance Program administered through the National Telecommunications and Information Administration of the U.S. Department of Commerce. VLN thus makes use of the Internet to allow learners to communicate with each other and benefit from sharing of personal experience via discussion forums and chatrooms. While interaction with other learners is an important step forward. distance learning requires optimal tutorial and help materials, the right teaching model approach to the learner, and a fast response to overcoming a learner's difficulties, all of which are not necessarily provided by the improvements found in VLN.

SUMMARY OF THE INVENTION

It is an object of the present invention to combine the use of intelligent and cognitive agents with mobile dissemination of effective synchronous and asynchronous learning.

The present system uses the Internet as a constructivist learning environment and aims to provide intelligent assistance to improve both quality of training and distribution of knowledge in a distance learning situation. The assistance is based on various intelligent Agents which act collaboratively to support learning at different steps. A first Agent (pedagogical Agent), close to the learner, is able to detect his difficulties using a learner model and provides local explanations when needed or on request. A second Agent (dialog Agent) provides access to other explanations or learners available on the Web, in synchronous or asynchronous mode. Taking into consideration all possible helps a third Agent (negotiating Agent) is in charge of finding and selling explanations according to a market of requests and helps. A fourth Agent (moderator) in charge of determining which explanation was finally useful to serve as a permanent source of explanation for future learners.

According to a first aspect of the invention, there is provided a method of providing intelligent tutoring information to a learner at a learner station, comprising providing tutorial curriculum data including help data to the learner station, the help data having a profile identifier for identifying the help data as belong to one of at least two learning model strategies, choosing a learning strategy for the learner, selectively presenting the help data as part of the tutoring information based on the selected learning strategy.

According to a second aspect of the invention, there is provided a method of providing intelligent tutoring information to a learner at a learner station, comprising providing an explanation from a remote source in response to the learner failing to understand a concept, the explanation relating to the concept, obtaining information at the learner station about the usefulness of the explanation, and updating data concerning the explanation in an explanation database based on the obtained usefulness information.

According to a third aspect of the invention, there is provided a method of providing intelligent tutoring information to a learner at a learner station, comprising detecting the learner failing to understand a concept and generating a concept vector, determining suitable tutor users for providing assistance in understanding the concept using the concept vector from a database of users, selecting one of the suitable users, establishing synchronous communications between the learner and the selected one of the suitable users; and engaging in a dialog to obtain an explanation for the misunderstood concept.

According to a fourth aspect of the invention, there is provided a method of providing intelligent tutoring information to a learner at a learner station, comprising detecting the learner failing to understand a concept and generating a concept vector, searching for suitable explanations corresponding to the concept vector in an explanation database to which the learner station has regular direct access, determining when the suitable explanations have been exhausted, and sending a request to at least one explanation negotiator including the concept vector, and retrieving an explanation corresponding to the concept vector from at least one different explanation database, and returning the explanation retrieved to the learner station.

BRIEF DESCRIPTION OF THE DRAWINGS

The invention will be better understood by way of the following detailed description of a preferred embodiment with reference to the appended drawings, in which.

DETAILED DESCRIPTION OF THE PREFERRED EMBODIMENT

Figure 1:
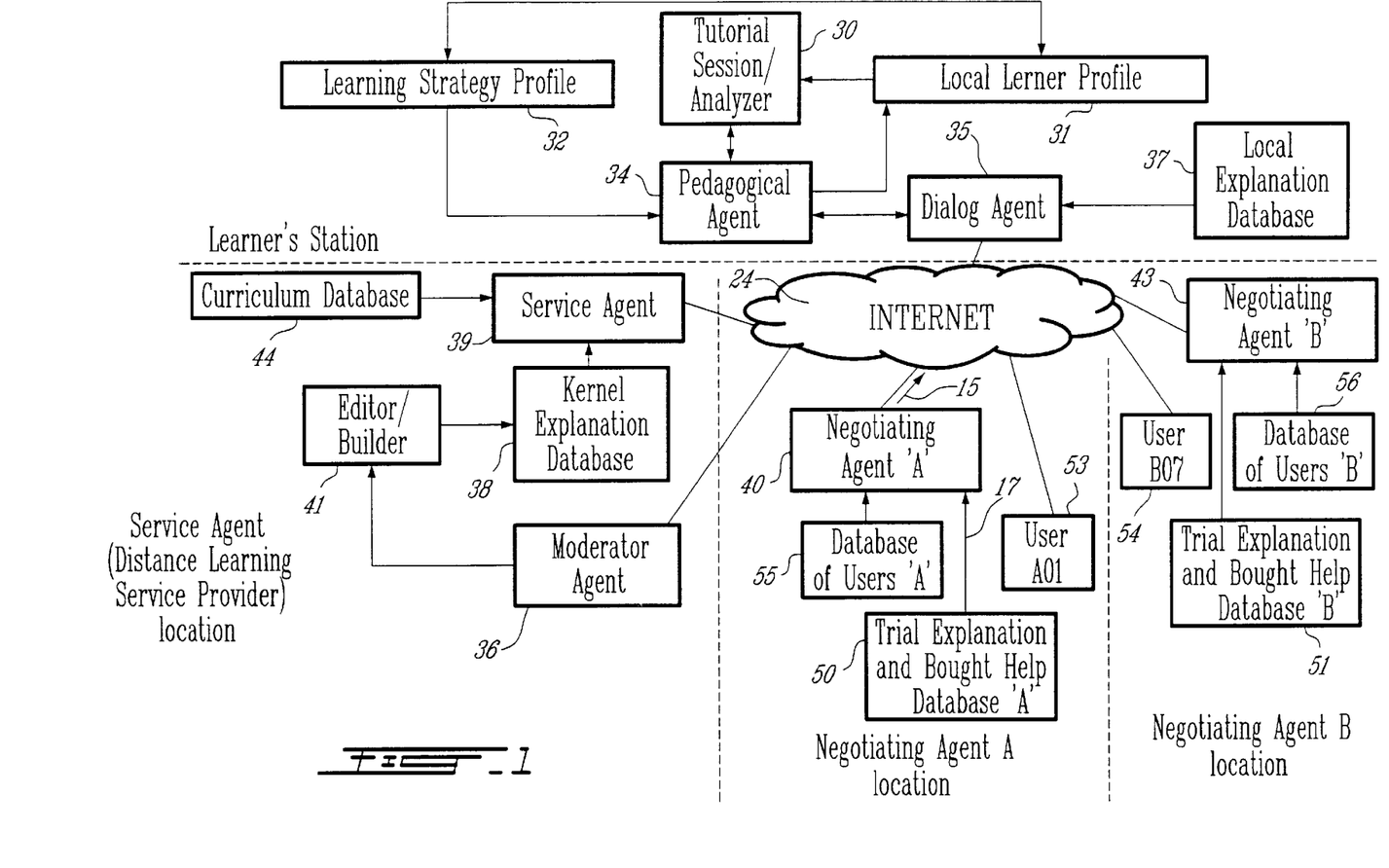
FIG. 1 illustrates a schematic block diagram of the system according to the preferred embodiment.

As illustrated in FIG. 1, there is provided, according to the preferred embodiment, a distance learning network including at least one learner's station, a service agent location, and a number of negotiating agent locations, all interconnected via a data network, such as the Internet. The service agent is, in the preferred embodiment, provided by the distance learning service provider. The first negotiating agent A * may be located at the same location as the service agent, or at a different location as illustrated in FIG. 1. The moderator agent 36 is illustrated as being located with the service agent 39, although it is shown as having its own connection to the data network and thus it could be separately located and communicate updates or changes to the Kernel Explanation database 38 via the network 24. It will be appreciated that the tasks and functions in the distance learning system are illustrated in FIG. 1 in accordance with one preferred embodiment, and that various possibilities for the distribution of tasks are within the scope of the present invention.

The learner station comprises a tutor analyzer or session device 30 which is provided by a computer workstation running educational software for teaching a curriculum provided in curriculum database stored in data storage 44. The user interface for the tutorial analyzer 30 is a graphical user interface, and uses hypertext links to provide controlled navigation within the tutorial material. The tutor analyzer device 30 is preferably a complete multimedia asynchronous learning station at which a user learns at his or her own pace.

Before entering the learning session, each user has to input personal identification, nominative characteristic and profile data to be stored in the local learner profile database 31. When an action from the user is detected by the tutor analyzer device 30 a pulse is sent to a pedagogical agent device 34 and the device 30 generates vectors for use by the pedagogical agent device 34. The vectors may include for example, a concept vector or a casual misunderstood concept vector. These two concept vectors detail and store the parameters and context of the user's problem. The primary purpose of the pedagogical agent 34 is to guide the learner/ user to the appropriate help or tutorial information to understand what is to be learned and to overcome any learning obstacles. As an alternative request mode, the user may directly request assistance to the pedagogical agent device 34.

Figure 3:
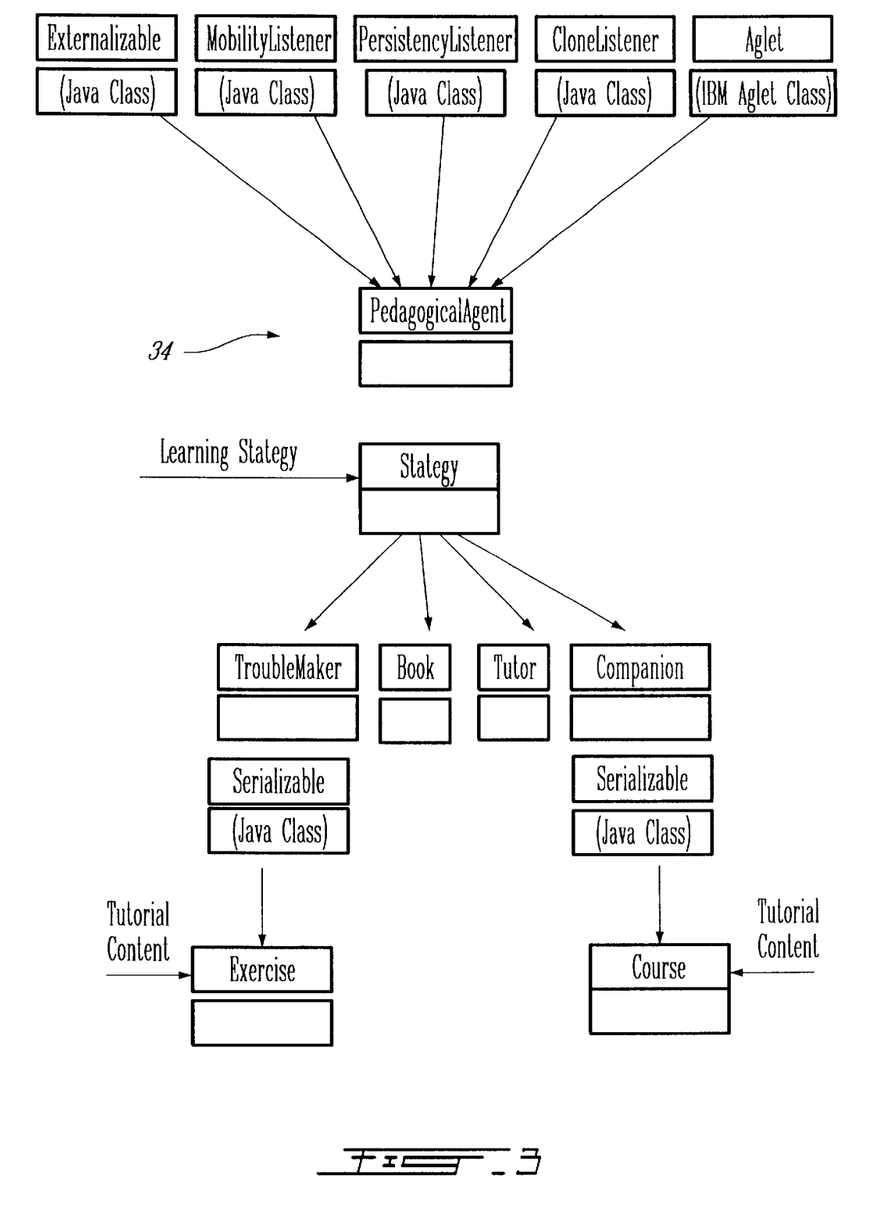
FIG. 3 is a schematic diagram illustrating a portion of the pedagogical agent according to the preferred embodiment.
Figure 4:
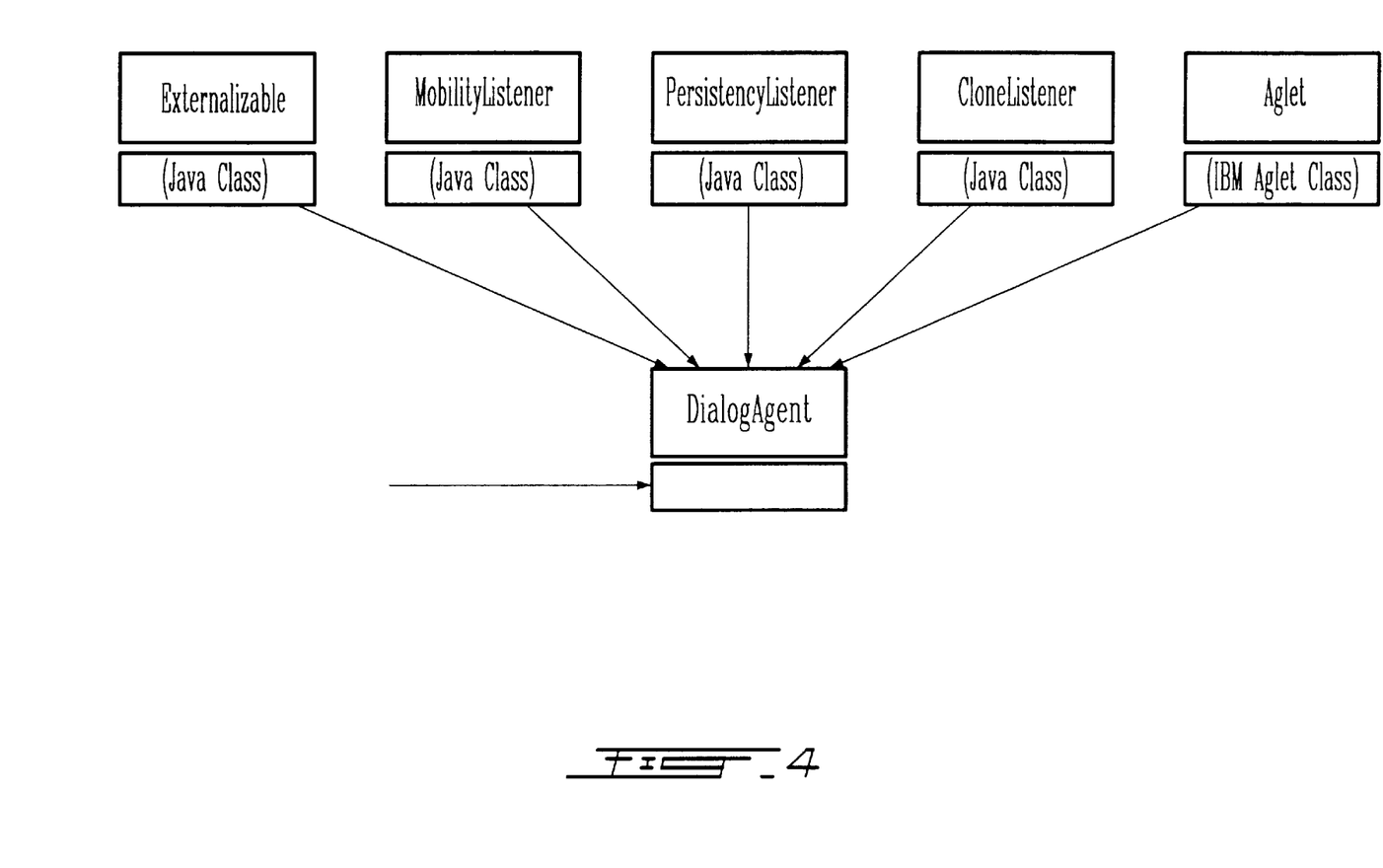
FIG. 4 is a schematic class diagram illustrating the components of the dialog agent, negotiator agent, service agent, and moderator agent, according to the preferred embodiment.

As is well known in the art, an agent is a cognitive agent, namely a computer program designed to respond to certain criteria and provide useful information or results in an automatic or semi-automatic manner. The structure of the components of the dialog agent, negotiator agent, service agent, and moderator agent is illustrated in FIG. 4. The moderator agent may not include the PersistencyListener class. The class diagram for the pedagogical agent is illustrated in FIG. 3.

To improve the ability of the pedagogical agent 34 to help learners understand the material, a earning strategy profile database is provided according to the preferred embodiment, and the pedagogical agent 34 adapts to the learning strategy. A learning strategy is a method model for teaching. Examples of such strategies are: the reference/text book; the companion; the trouble-maker; and the tutor. In the reference or text book strategy, the pedagogical agent will, at least as a first course of action, offer definitions and reference explanation in response to the learner's having difficulty. Such a strategy is useful for learners who understand better by absorbing information and details. The companion approach is one which tries to help out in the learning process by giving hints and suggestions to the learner during the learning process. The trouble-maker approach is one which tries to stimulate the learner by teasing and giving a mixture of truthful hints and clearly misleading hints, the opposite of which may be the correct answer. The trouble-maker has the advantage that it may evoke a somewhat emotional response from the learner and thus stimulate interest and focus on the learning process. The tutor approach provides a higher content of analogous examples and exercises to teach the material being learned. Since the examples and exercises may be easier or involve only part of the new concept being learned, the tutor approach can help the learner understand by building up to a full understanding of the concept to be learned or by leading the way to fully understanding in a step-by-step manner.

Figure 2:
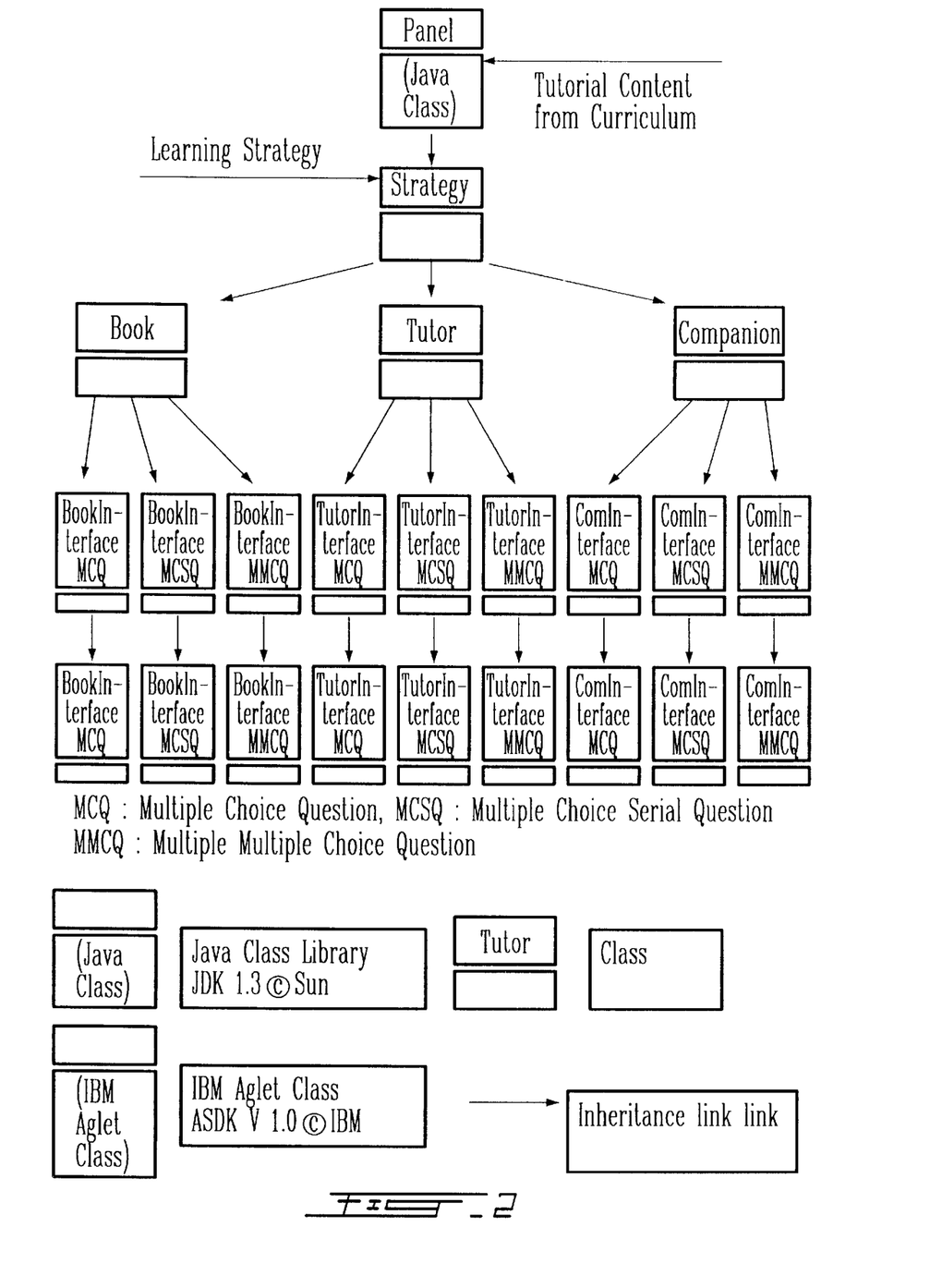
FIG. 2 is a schematic diagram illustrating a portion of the tutor analyzer according to the preferred embodiment.

It will be understood that the pedagogical agent can mix to any degree or proportion the various learning strategies. For each learning strategy supported by the system, the curriculum material has tutorial content for each strategy. The agent 34 then selects the appropriate tutorial content according to the prevailing learning strategy defined in the learning strategy profile. A switch to a different strategy may be prompted by detecting a learner's difficulty in mastering a topic, or as a function of time for the purposes of providing variability and stimulating interest. Since the tutorial session is interactive, the learner is requested to provide answers and select options indicative of understanding, as the curriculum material is covered. As shown in the component diagram of FIG. 2, the interface may provide multiple choice questions, multiple choice serial questions or multiple multiple choice questions. The agent 34 detects correct and false answers and input. The strategies may be defined by different categories or characteristics, and the agent 34 may select a strategy class for a period of time or select a tutorial help item according to a desired strategy category or characteristic. Statistical data collected from other learners using such learner stations may also be compiled to ascertain which tutorial help items are most effective for all or certain types of learners in a particular curriculum, and thus the agent 34 may follow a core program of help items of varying strategies which has a good history of success.

At the beginning of a learning session, a curriculum is selected. In the preferred embodiment, the curriculum is provided by the service agent 39 which is remotely located. A request to retrieve the selected curriculum is sent from the pedagogical agent 34 through the dialog agent 35 to the service agent 39 which in turn retrieves the curriculum object from a database 44 and transfers the data to agent 34 for storage locally for use by both the agent 34 and tutor session analyzer or manager 30 which includes the learner's interface. The pedagogical agent device 34 is provided by software operating locally which uses the current state variables as well as, preferably, the history of the state variables from the current concepts vector to select first, a curriculum item, namely an Exercise or Theory assignment and second, a convenient learning strategy, according to the current state variables. Then, the pedagogical agent device 34 requests the tutor analyzer device 30 to display the selected items to the user.

When the pedagogical agent 34 exhausts the tutorial help items contained within the curriculum file itself, or before this time if the agent 34 sees fit, agent 34 requests from the dialog agent 35 an explanation from local explanation database 37. In the preferred embodiment, database 37 contains explanations of concepts or curriculum items which have not been refined to follow a specific learning strategy. The explanations in the database 37 have, however, been previously tried and are considered to be usually successful in helping the learner understand a particular point or concept. While the agent 34 could access database 37 directly, explanations are in the preferred embodiment retrieved through the dialog agent 35 which handles the process of getting a required or best explanation.

The process of getting an explanation in response to a particular vector involves making a decision as to which explanation is best suited from within the local database 37 and the kernel database 38 located at the service agent 39. Preference is given to local explanations, however, experience may indicate that a kernel database explanation is best suited. The dialog Agent 35 is provided by software operating locally which uses the dialog local explanation database 37 to supply one or more established explanation messages and also to suggest a best one of the explanation messages for display within the tutor analyzer 30 via the pedagogical Agent 34. In the case of a well-developed curriculum and established local explanation message database, there would typically be no need to provide any further pedagogical assistance to the user. However, it is expensive and time consuming to develop a learning system which can anticipate every problem and provide explanations which will satisfy every user.

The dialog agent 35 thus obtains from the remote Kernel explanation database 38 the best possible auxiliary explanation for the learning problem being tackled by the user, since the pedagogical agent 34 has already been used to obtain a best established explanation message from the local explanation database 37. As local resources are exhausted a help request with context data or a concept vector is generated by the dialog agent 35 which context data is used for extracting the best trial explanation messages—first, by exploiting the kernel explanation database 38 via the service agent 39 and returning an updated explanation vector—and second, when all remote kernel resources are exhausted, the strategy must be set to "companion" mode (if it is not, the pedagogical agent 34 is requested to turn on this strategy). In such mode, new helps can be expected via the negotiating agent 40,43 from database 50,51. The service agent 39 is a Client-Server device framed to remotely exploit both the kernel explanation database 38 and the curriculum database 44 when asked by a dialog agent 35.

Whenever the dialog agent 35 retrieves an explanation from either the service agent or the local database 37, the pedagogical agent 34 provides a signal after the explanation has been used to determine how useful the explanation was. This signal may be automatically determined from the learner's progression, or the learner may be asked directly to select a usefulness indicator or input a statement on usefulness of the explanation. This signal is used for ranking and indexing purposes in database 37 or 38 as the case may be. In the preferred embodiment, the usefulness data is sent directly to the moderator agent 36 which is situated locally to the service agent 39, and thus the moderator agent 36 is responsible for receiving the usefulness signal from agent 34 (through agent 35 and the Internet 24) for the purposes of adjusting ranking and possibly removing explanations from the kernel database 38. Alternatively, the negotiating agent 'A' 40 associated directly with the learner could receive the usefulness data, and provide the necessary signal to the moderator agent 36. A database editor/builder module 41 aids the moderator agent in modifying and updating database 38. The editor/builder 41 and the moderator agent 36 also have the ability to insert new explanations into the database 38, as described further hereinbelow.

When the dialog agent 35 is requested to retrieve an explanation in response to a particular concept vector, and no suitable explanation is available either in database 37 or in database 38, the remaining option is to search for an explanation elsewhere. This process may be likened to obtaining an alternative explanation from a "market" of explanations. In the preferred embodiment, a number of negotiating agents 40,43 are provided. Each agent 40 is a broker of explanations, and may charge a fee for providing an explanation. Since the curriculum used by the service agent or users associated with a particular negotiating agent 40,43 may or may not be the same as the one used by the service agent 39 and the tutorial session 30, the negotiating agents 40,43 include a concept vector translation table. For example, two freshman physics curriculums developed and used independently by different colleges would have different vector systems, although the subject matter is substantially the same. The negotiating agents 40,43 would be able to obtain an explanation found useful in one curriculum by translating the concept vector between the two curriculum systems. Thus, the negotiating agent may find a suitable explanation useful in understanding a particular concept from a different institution or system.

Each negotiating agent 40,43 has access to its own database or databases of explanations 50,51, which may be the same as or similar to kernel explanation database 38, although the explanations may also be more experimental or unproven. Purchase of explanations may be arranged on a "pay-for-it-only-if-it-works" basis, such that any possible explanation may be delivered in response to a request.

When fixed explanations are not available or deemed to be suitable, synchronous help, i.e. an exchange of messages with another learner (or a teacher) is sought. In this mode of communications, the negotiating agents 40,43 are requested by the dialog agent 35 to find a user who has overcome a difficulty in learning (or otherwise has mastered) the subject matter relating to the vector. Each agent 40,43 has access to a database of users 55,56 which indicates the users' knowledge base (i.e. what curriculums they are familiar with) and if possible what specific vectors they have mastered. The agents 40,43 then broker a connection between agent 35 and a user 53,54, depending on availability of the user 53,54 and skill level. The nature of the synchronous communication may be a video or voice communications connection, with or without involving the tutorial session 30 software to facilitate communication of the curriculum topic between the parties.

Therefore, according to the preferred embodiment, two levels of external assistance are provided. The dialog agent 35 is provided in software local to the tutor analyzer for the following two purposes.

In a first objective to determine from a database of users 55,56 connected via a negotiating agent 40,43 to network 24 which users would be competent to answer a question concerning the particular context or subject matter identified by the context data signal. Once the dialog agent 35 has obtained the name and network address for one or more other users, the petitioner dialog agent 35 allows the user to select a user and the selected user data is passed to network 24 for establishing a communication session between the selected other user and the user of tutor analyzer device 30. The pin-pointed dialog agent 35 may also provide data to the pedagogical agent 34 which can be used for identifying the problem which the user is trying to solve or for preparing a query for the other user as a help request companion. The synchronous communications interface may be provided by a Web browser communications module (not shown in FIG. 1) external to tutorial session module 30 (it may be Netscape, or Internet Explorer or another software package). This browser provides a communication system by means of e-mail, video conferencing, voice communication or a text-based chat session between the local learner and the other remote user for the purposes of providing an explanation of the problem faced by the local user (unless the problem was perfectly defined by the concept vector), which problem is presumed to be unexplainable by any of the established explanation messages in local database 37 or by any of the explanation messages finally stored in kernel explanation database 38. The browser is then used to facilitate communication and teaching of the topic to be learned.

In the preferred embodiment, the dialog agent 35 records the synchronous session. When the synchronous session is over, the pedagogical agent 34 queries the learner to input information about the usefulness of the explanation given. The learner could be given an opportunity to author the explanation based on the recorded session (or based on his or her memory of the synchronous session), however, in the interest of ensuring that the explanation is recorded without fail, an automatic process not involving the learner is preferred. The usefulness of the explanation, the concept vector along with any learner-provided description of the problem, as well as the recorded explanation is sent from agent 35 to a moderator agent 36 for assessment, filtering, and formatting. As mentioned above, it is alternatively possible for the negotiating agent 40 to receive the data concerning the success or usefulness of the explanation, so that the negotiating agent can process this data and/or selectively forward it to the moderator agent 36 it chooses. The moderator agent 36 then passes the new explanation to the explanation database editor/builder 41. Since the moderator agent may be remote from the service agent 39, the explanation record sent to the editor 41 could also be via network 24. The moderator agent may optionally purchase the explanation, either with payment up front, or on a "pay-for-it-only-if-it-works" basis. The payment made by the moderator agent may be directly to the user who provided the explanation, or to the learner, with the possibility of sharing in any suitable manner between the learner, the user, the moderator agent and the negotiating agent.

The negotiating agent 40 is the remote representative in synchronous or asynchronous mode of both the user and its local situated dialog 35 and pedagogical 34 agents, The negotiating Agent 40 is provided by software operating in synchronous or asynchronous remote access which uses the network communication to bargain helps supply with other negotiating agents 43, as senders or buyers. The trial explanation message data 17 is returned as a new explanation vector 15 to the pedagogical Agent 34 via the petitioner negotiating agent 40 and network 24. The pedagogical agent 34 is also responsible for obtaining from the user an indication of the usefulness or helpfulness of the trial explanation message for the particular context or problem being solved according to the return—or not—of the misunderstood concepts vector, and the dialog agent 35 sends out over network 24 explanation success data to a moderator agent 36.

The moderator agent 36 receives from all users connected to network 24 explanation success data either directly or via each negotiating agent 40,43, and compiles statistical data for generating a signal indicating the utility of the trial messages so it may edit explanations for storing accordingly. The moderator agent 36 may remove trial explanation messages which have been found to be of no use, or it may merely alter the rankings of trial explanation messages as being useful for providing answers according to the various context so as to cause less useful trial explanation messages to appear less often, and trial explanation messages which are found to be useful in explaining particular types of subject matter to have their ranking or importance increased to provide the most relevant trial explanation messages first. The moderator agent 36 may include a screening procedure for determining whether the proposed new explanation is worthy of being entered 21 into the kernel explanation database 38.

At the end of each user's learning session, the user is prompted to identify whether the assistance obtained was satisfactory and provided the required explanation. The pedagogical agent 34 sends a message to each negotiating agent 40,43 or directly to the moderator agent 36, as the case may be, to have the explanation(s) received updated in the Kernel explanation database 38 or in database 50,51, and also to indicate whether the selected teacher users have been of assistance successfully once again for updating a ranking in database 55,56. In this way, a ranking of the success of other users at being helpful may be provided as valid explanation from the moderator agent 36 to allow users to make a better choice of other users via their negotiating agent 40,43.

The invention may also provide for the updating of the local explanation database 37. Such an update can take place either under the control of the service agent 39 or of the negotiating agent 40,43. The negotiating agent 40,43 may send the explanation vector through network 24 to update the local explanation database 37 in the case of an explanation resulting from the companion or synchronous help mode.

When a user successfully completed a portion of the tutorial curriculum, the pedagogical agent 34 can update the local learner profile database 31 with the issued learner profile and it sends a message to the negotiating agent 40 identifying the user's experience and to indicate that the user of a tutorial session has mastered the subject matter of that particular portion of the curriculum being learned. This information may subsequently be sent to the negotiating agent 40 associated with the learner for the purposes of updating database 55.

It will be apparent to those skilled in the art that various modifications and variants are possible with the scope of the present invention, as defined in the appended claims.

What is claimed is:

1. A method of providing intelligent tutoring information to a learner at a learner station during an automated tutoring session, the method comprising:

providing tutorial curriculum data including help data to the learner station, the help data being separate from said curriculum data, stored in a local explanation database and having a profile identifier for identifying individual items of the help data as belonging to at least one of at least two learning model strategies;

automatically choosing a learning strategy for the learner;

determining a need for help data during said tutoring session; and selectively presenting the help data as part of the tutoring information based on the selected learning model strategy.

2. The method as claimed in claim 1, wherein the at least two learning strategies comprise a reference/text book strategy; a companion strategy; a trouble-maker strategy; and a tutor strategy.

3. The method as claimed in claim 2, wherein the step of choosing a learning strategy is repeated in order for the learner to change strategies while the learner is in the process of learning the tutorial curriculum.

4. The method as claimed in claim 3, wherein the learning strategy is changed in response to detecting a learner's inability to understand the tutorial curriculum.

5. The method as claimed in claim 1, wherein the step of choosing a learning strategy is repeated in order for the learner to change strategies while the learner is in the process of learning the tutorial curriculum.

6. The method as claimed in claim 5, wherein the learning strategy is changed in response to detecting a learner's inability to understand the tutorial curriculum.

7. A method of providing intelligent tutoring information to a learner at a learner station, the method comprising:

automatically detecting the learner's failing to understand a concept at the learner station and sending a request for an explanation from a remote source, said request identifying the concept;

providing an explanation from said remote source in response to the learner's failing to understand the concept, the explanation relating to the concept and being selected based on an established usefulness of the explanation in relation to the concept;

obtaining information at the learner station about the usefulness of the explanation in relation to the learner's understanding of the concept; and updating data concerning the usefulness of the explanation in relation to the concept in an explanation database based on the obtained usefulness information.

8. The method as claimed in claim 7, wherein the remote source is a service agent which interprets a concept vector received from the learner station and obtains the explanation from the explanation database.

9. The method as claimed in claim 7, wherein the remote source is a synchronous tutor with whom the learner engages in a dialog to obtain the explanation, the step of updating including:

preparing data representing the explanation and the concept; and transmitting the data representing the explanation and the concept to the explanation database for entry as a new explanation.

10. The method as claimed in claim 7, wherein the step of updating the data concerning the explanation comprises changing a ranking parameter for the explanation in the explanation database.

11. A method of providing intelligent tutoring information to a learner at a learner station, the method comprising:

detecting the learner failing to understand a concept and generating a concept vector;

searching for suitable explanations corresponding to the concept vector in an explanation database to which the learner station has regular direct access;

determining when the suitable explanations have been exhausted, and sending a request to at least one explanation negotiator including the concept vector;

retrieving an explanation corresponding to the concept vector from at least one different explanation database, and returning the explanation retrieved to the learner station.

12. The method as claimed in claim 11, wherein the negotiator charges a fee for explanations, further comprising a step of accepting the fee by the learner station.

13. The method as claimed in claim 11, wherein the step of retrieving comprises translating the concept vector, the learner station using a different curriculum than a curriculum associated with the at least one different explanation database.

* * * * *